United States Patent [19]

Unger et al.

[11] Patent Number: 4,694,379

[45] Date of Patent: Sep. 15, 1987

[54] CONTROL PANEL FOR ELECTRONIC INSTRUMENTS

[75] Inventors: Peter J. Unger, Beaverton; Jon C. Mutton, Milwaukie, both of Oreg.

[73] Assignee: Tektronix, Inc., Beaverton, Oreg.

[21] Appl. No.: 698,211

[22] Filed: Feb. 4, 1985

[51] Int. Cl.⁴ .............................................. H02B 1/04
[52] U.S. Cl. .................................... 367/419; 361/393;
361/400; 439/140; 439/152
[58] Field of Search ................... 339/36, 40, 42, 75 R, 339/75 M; 200/294, 296; 16/291, 293, 362–364; 312/205, 223, 326; 361/331, 340, 359, 363, 370, 371, 375, 391, 393, 394, 400, 405, 406, 419, 420, 427, 429

[56] References Cited

U.S. PATENT DOCUMENTS

| | | |
|---|---|---|
| 1,117,647 | 11/1914 | Durbin .................................. 339/42 |
| 1,171,914 | 2/1916 | Wright .................................. 339/42 |
| 2,913,634 | 11/1959 | Scoville .............................. 361/393 |
| 4,039,902 | 8/1977 | Lacan .................................. 361/400 |
| 4,507,526 | 3/1985 | Thoma ................................ 361/393 |

*Primary Examiner*—G. P. Tolin
*Attorney, Agent, or Firm*—John P. Dellett; Robert S. Hulse

[57] ABSTRACT

A control panel supports and positions interchangeable subunit electronic devices and provides a neat and uniform outwardly facing surface. When subunit electronic devices are disconnected from the control panel, cover plates extend and conform to the uniform outwardly facing surface. Hinged support members "lock" in an over center position to rigidly support each cover plate. Electrical connectors protruding from each subunit electronic device "unlock" the hinged support members from the over center position when the subunit electronic device is urged toward the cover plate.

5 Claims, 3 Drawing Figures

CONTROL PANEL FOR ELECTRONIC INSTRUMENTS

BACKGROUND OF THE INVENTION

This invention relates generally to control panels and in particular to control panels for supporting and positioning subunit electronic devices while providing electrical connections for an electronic instrument.

Prior art control panels have been used to support, position, and connect subunit electronic devices such as alphanumeric keyboards, numeric keypads, thumbwheels, indicator lights, and an assortment of other subunits. It is desirable to be able to interchange these subunits and place each subunit in a convenient position. For example, a convenient position for a left-handed operator may be an awkward position for a right-handed operator. It also may be necessary to exchange subunit devices for complex testing procedures. When an electronic subunit was disconnected, the prior art control panels exposed electrical connections and a cavity. Each replacement subunit electronic device had to have dimensions conforming to the empty cavity.

SUMMARY OF THE INVENTION

In accordance with an embodiment of the present invention, a unitary control panel includes a plurality of rectangular cover plates supported by hinged support members. When the hinged support members are fully extended, the cover plates form a uniform, rigid, and substantially planar outwardly facing surface. When a subunit electronic device is connected, the hinged support members unlock and fold so the face of the subunit electronic device conforms to the uniform outwardly facing surface. Uniform electrical connections are provided between each subunit electronic device and an electrical circuit board beneath the control panel.

It is an object of the present invention to provide an improved control panel that simplifies interchange of subunit electronic devices while maintaining a neat and uniform outwardlly facing surface.

It is another object of the present invention to provide an improved control panel with interchangeable electrical connections between subunit electronic devices and an electrical circuit board for an electronic instrument.

It is yet another object of the present invention to provide an improved control panel that permits interchange of electronic subunit devices having different lengths and widths.

Yet another object of the present invention is to provide an improved control panel that protects exposed electrical connections and conceals the cavity left when a subunit electronic device is disconnected.

The subject matter of the present invention is particularly pointed out and distinctly claimed in the concluding portion of this specification. However, both the organizaton and method of operation of the invention, together with further advantages and objects thereof, may best be understood by reference to the following description taken in connection with the accompnaying drawings wherein like reference characters refer to like elements.

DETAILED DESCRIPTION

Figure 1:
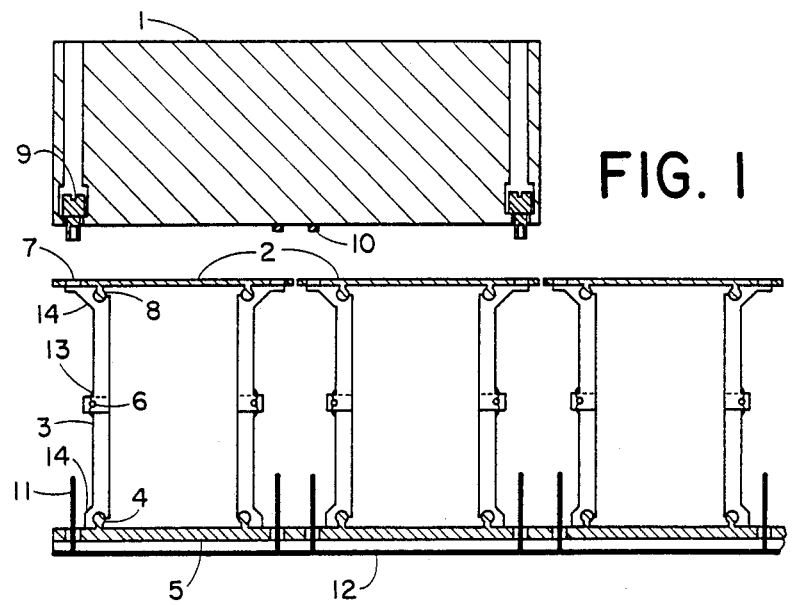
FIG. 1 is a horizontal cross section of a control panel according to the present invention with cover plates in the extended position and a subunit electronic device disconnected from the control panel.

Referring to the drawings and particularly to FIG. 1, a portion of the control panel according to the present invention is illustrated in cross section. The control panel includes a plurality of planar cover plates 2 supported by hinged support members 3 which are attached to base plate 5 at lower hinge 4 and to each cover plate at upper hinge 8. Each support member is provided with a center spring 13 to force the hinged support member into the upright or fully extended position when subunit electronic device 1 is not present, as shown in FIG. 1. At this time the cover plates form a rigid, uniform, and substantially planar outwardly facing surface. The central pivot 6 of each hinged support member is urged by the center spring into a locked or slightly over center position so that the cover plate will not move towards the base plate when pressure is applied. Each hinged support member is further provided with a hinge arm protection 7 at the tip of outward hinge arm stop 14. The hinge arm projection passes through a corresponding hole in the cover plate when the hinged support member is in the fully extended position. Outward and inward hinge arm stops 14 stop against the cover plate and base plate respectively to prevent each hinged support member from rotating beyond the fully extended or slightly over center position. Thus, each cover plate is rigidly supported to provide a uniform outwardly facing surface.

A subunit electronic device 1, which may be any of an assortment of devices including an alphanumeric keyboard, numerical keypad, joystick, thumbwheels, or indicator lights, is provided with captive elongate electrical connectors 9 for making connection when the subunit is joined to the control panel. These protruding elongate electrical connectors may be internally threaded or securable by other means to corresponding elongate electrical connectors 11 in the form of threaded studs attached to electrical circuit board 12. The circuit board electrical connectors extend in spaced or insulated relation through corresponding holes in base plate 5.

Figure 2:
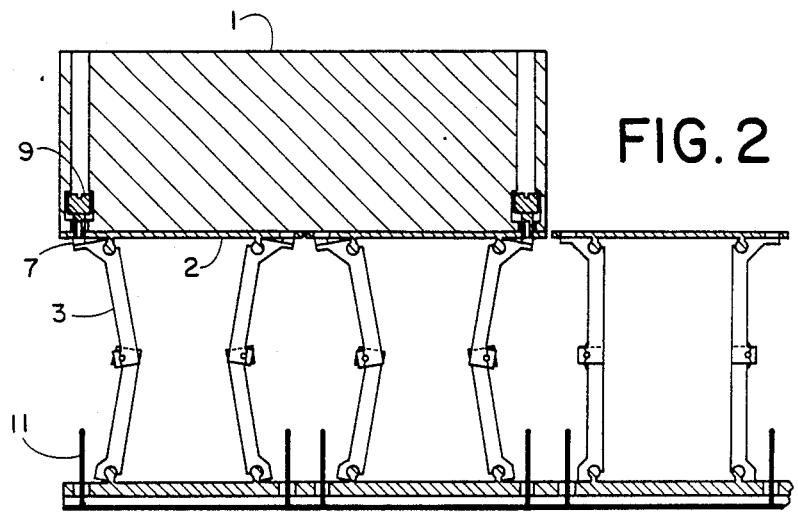
FIG. 2 is a cross section of the control panel and a subunit electronic device placed in contact with the cover plates before making electrical connection.
Figure 3:
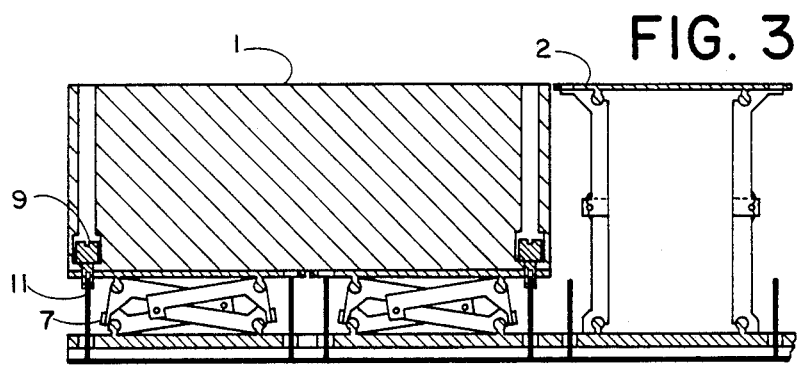
FIG. 3 is a cross section of the control panel and a subunit electronic device in a connected position.

Referring now to FIG. 2, when a subunit 1 is depressed against cover plates 2, the captive electrical connectors 9 depress hinge arm projections 7 and "unlock" cover plates from the rigid fully extended position. The hinged support members 3 rotate and fold from an over center position into a collapased position and the subunit electrical connectors 9 can now make threaded connection with corresponding circuit board electrical connectors 11. FIG. 3 shows a connected subunit electronic device. The fully extended cover plates and the face of a connected subunit electronic device form a uniform and substantially planar outwardly facing surface.

The drawings illustrate a subunit electronic device having a length twice that of each cover plate. The length and width of each subunit electronic device may be any integer multiple of the length and width of each cover plate. Those having a length or width greater than one cover plate are provided with intermediate projections 10 which act to depress hinge arm projections 7 and unlock each hinged support member between the subunit electrical connectors.

The present invention provides a control panel having a neat and uniform outwardly-facing surface while permitting the operator to quickly connect, disconnect, and interchange different subunit electronic devices. The advantages of the present invention also include providing secure, uniform, and interchangeable electrical connections for an electronic instrument such as an oscilloscope or computer.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A control panel system, comprising,
   a subunit electronic device,
   at least one planar cover plate,
   a base plate,
   a plurality of hinged support members supporting said at least one planar cover plate from said base plate,
   said hinged support members having an extended position wherein said support members are substantially locked in an over center configuration, and
   means provided on said subunit electronic device for unlocking said support members when said subunit electronic device is urged toward said cover plate, and wherein said unlocking means comprises means protruding from said subunit electronic device, and wherein said support members are provided with arm portions engageable by said unlocking means for rotating said support members out of said over center configuration, and, further wherein said at least one planar cover plate is perforated with holes through which said unlocking means are received to engage said support members.

2. The control panel according to claim 1 wherein said unlocking means also comprises electrical connecting means for said subunit electronic device.

3. The control panel according to claim 1 including an electrical circuit board on the inwardly facing side of said base plate,
   said electrical circuit board being provided with electrical connecting means for connection with said subunit electronic device.

4. The control panel according to claim 1 wherein the planar surface length and width of said subunit electronic device are substantially positive integer multiples of the planar surface length and width of said at least one planar cover plate.

5. A control panel system, comprising:
   a plurality of subunit electronic devices having first electrical connectors,
   at least one planar cover plate perforated with holes removably receiving said first electrical connectors,
   a base plate receiving second electrical connectors,
   and a plurality of hinged support members affixed to said base plate and supporting said at least one planar cover plate, said hinged support members being extendable for supporting said at least one planar cover plate at a substantially planar outwardly facing surface, and collapsible causing mating of said first electrical connectors with said second electrical connectors, wherein the outward ends of said hinged support members are provided with projections which removably project into holes in said at least one planar cover plate.

* * * * *